(12) United States Patent
Yoshitake et al.

(10) Patent No.: US 7,633,381 B2
(45) Date of Patent: Dec. 15, 2009

(54) ELECTRONIC KEY SYSTEM FOR A LEISURE VEHICLE

(75) Inventors: Hideto Yoshitake, Akashi (JP); Satoru Watabe, Akashi (JP); Tomoyuki Takahashi, Akashi (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 300 days.

(21) Appl. No.: 11/903,525

(22) Filed: Sep. 21, 2007

(65) Prior Publication Data

US 2008/0074243 A1 Mar. 27, 2008

(30) Foreign Application Priority Data

Sep. 22, 2006 (JP) ............................. 2006-256946

(51) Int. Cl.
*B60R 25/10* (2006.01)
(52) U.S. Cl. ............................. 340/426.36; 340/426.13; 340/411
(58) Field of Classification Search .............. 340/425.5, 340/426.13, 426.16, 426.17, 426.18, 426.35, 340/426.36, 441, 467; 307/10.1; 455/456.1, 455/456.6; 701/36, 49
See application file for complete search history.

(56) References Cited

U.S. PATENT DOCUMENTS

| | | | | |
|---|---|---|---|---|
| 6,944,528 B2 * | 9/2005 | Nagano | ....................... | 701/49 |
| 7,450,955 B2 * | 11/2008 | Himmelstein | ............ | 455/456.1 |
| 2006/0181409 A1 * | 8/2006 | Yamamoto et al. | .......... | 340/532 |
| 2007/0294746 A1 * | 12/2007 | Sasakura et al. | ............... | 726/2 |
| 2009/0145181 A1 * | 6/2009 | Pecoul et al. | ................. | 70/237 |

FOREIGN PATENT DOCUMENTS

JP 2005-335675 12/2005

* cited by examiner

*Primary Examiner*—Van T. Trieu
(74) *Attorney, Agent, or Firm*—Alleman Hall McCoy Russell & Tuttle LLP

(57) ABSTRACT

An electronic key system for a leisure vehicle is provided. The electronic key system may include a portable device configured to transmit a user identification code, and an electronic key controller that is configured to receive the user identification code and to cause an electric power supply of the leisure vehicle to be turned on upon receiving the user identification code. The electric key controller may be configured to transmit a confirmation signal when acceleration of the leisure vehicle is higher than a predetermined acceleration value, and the portable device may be configured to, upon receiving the confirmation signal, transition from a sleep mode to an active mode to transmit a response signal to the electronic key controller. The electronic key controller may be configured to output a control signal to cause an alarm to be raised when no response signal is received.

6 Claims, 4 Drawing Sheets

ELECTRONIC KEY SYSTEM FOR A LEISURE VEHICLE

TECHNICAL FIELD

The present invention generally relates to an electronic key system for a leisure vehicle that is configured to transmit a user identification code by radio from a portable device capable of transmitting/receiving data to and from an electronic key controller which is mounted in the vehicle and configured to turn on an electric power supply built into the vehicle upon receiving the user identification code from the portable device. More particularly, the present invention relates to an electronic key system configured to detect a loss of the portable device.

BACKGROUND

In recent years, an electronic key system has been incorporated into leisure vehicles such as motorcycles, which are open to the outside, as in general automobiles. As used herein, the term "leisure vehicles" refers to vehicles that are open to the outside, such as motorcycles, three-wheeled vehicles, all terrain vehicles, utility vehicles, personal watercraft, or snowmobiles.

In such electronic key systems, a user need not insert a key into a key hole of a main switch for locking or unlocking. When the user carrying in a pocket or the like a portable device capable of transmitting/receiving data comes closer than a predetermined distance away from the leisure vehicle, an unlocking operation or an ON-operation of the main switch is carried out, whereas when the user comes farther than the predetermined distance away from the leisure vehicle, a locking operation or an OFF-operation of the main switch is carried out. Thus, the electronic key system is convenient to the user.

In cases where a user of a motorcycle equipped with the above described electronic key system puts the portable device on a fuel tank, a bag, or the like for a moment and then pays money in a gas station or a tollbooth of a toll road, the portable device will fall off to the ground and will be lost if the user starts the motorcycle without noticing that the portable device is left thereon. In other cases where the user puts money out of and into a wallet in the gas station or in the tollbooth, the user may drop the portable device from the pocket or the like by mistake.

Japanese Laid-Open Patent Application Publication No. 2005-335675 discloses an electronic key system equipped in the leisure vehicle which is intended to avoid the loss of a portable device. This electronic key system is configured so that an electronic key controller built into the vehicle transmits a confirmation signal at predetermined time intervals, and a portable device is configured to transmit a response signal to the electronic key controller upon receiving the confirmation signal from the electronic key controller. Based on the received response signal, the electronic key controller confirms that the portable device is not lost. On the other hand, when the electronic control controller does not receive the response signal, it determines that the portable device has been lost, and causes an alarm to be raised to inform a user (or rider) of the loss of the portable device.

In the above electronic key system, since a battery built into the portable device has a small capacity, the portable device transitions from a sleep mode to an active mode upon receiving the confirmation signal so that consumption of battery power is reduced. However, life of the battery in the above electronic key system is still short, and therefore would be desirable to extend.

SUMMARY OF THE INVENTION

The present invention addresses the above described conditions, and an object of the present invention is to provide an electronic key system for a leisure vehicle which is capable of effectively inhibiting loss of a portable device, and of extending a life of a battery built into the portable device.

According to the present invention, there is provided an electronic key system for a leisure vehicle, comprising a portable device configured to transmit a user identification code by radio; and an electronic key controller which is equipped in a vehicle body of the leisure vehicle and is configured to receive the user identification code from the portable device and to cause an electric power supply of the leisure vehicle to be turned on upon receiving the user identification code; wherein the electric key controller is configured to transmit a confirmation signal to the portable device when acceleration of the leisure vehicle has an acceleration value higher than a predetermined acceleration value, and the portable device is configured to, upon receiving the confirmation signal, transition from a sleep mode to an active mode to transmit a response signal to the electronic key controller; and wherein the electronic key controller is configured to output a control signal to cause an alarm to be raised, when the electronic key controller does not receive the response signal from the portable device in response to the confirmation signal within a predetermined time.

In order to conceive the electronic key system for the leisure vehicle of the present invention, the inventors focused attention on an acceleration state of the leisure vehicle where the portable device put on a tank, a meter panel, or in a pocket, is likely to fall off therefrom. The electronic key system is configured to detect such an acceleration state and the electronic key controller is configured to transmit the confirmation signal to the portable device based on this detection. Receiving the confirmation signal, the portable device transitions from a sleep mode to an active mode and transmits the response signal to the electronic key controller. With this configuration, the loss of the portable device can be effectively inhibited. Since the confirmation signal is transmitted only in the acceleration state having the acceleration value higher than the predetermined acceleration value, the portable device is able to be in the sleep mode for a longer time. This makes it possible to effectively avoid wasteful electric power consumption of the battery built into the portable device.

The electronic key controller may cause the alarm to be raised, when the electronic key controller does not receive the response signal continuously for a predetermined number of times from the portable device in response to the confirmation signal transmitted from electronic key controller to the portable device. This makes it possible to effectively inhibit malfunction, or to effectively eliminate an error signal such as noise. As a result, the loss of the portable device can be detected with higher reliability.

The acceleration having the acceleration value higher than the predetermined acceleration value may occur upon determining that the leisure vehicle has started travel. This makes it possible to effectively avoid the loss of the portable device, and to effectively avoid wasteful electric power consumption of the battery built into the battery.

The acceleration having the acceleration value higher than the predetermined acceleration value may occur upon determining the leisure vehicle is in a state where a travel speed of the leisure vehicle is in a speed range higher than a predetermined upper limit speed value. With this configuration, the possibility that the portable device falls off from the pocket or the like to the ground and is lost will be reduced. Such an electronic key system is suited for practical use.

The electronic key controller may be configured to transmit the confirmation signal after the travel speed of the leisure vehicle becomes higher than the predetermined upper limit speed value, and to transmit a request signal to the portable device to request the portable device to further transmit the response signal when the electronic key controller does not receive the response signal continuously predetermined number of times. Such an electronic key system is suited for practical use.

The electronic key controller may be configured to transmit the confirmation signal again, when the travel speed of the leisure vehicle becomes lower than a predetermined lower limit speed value, and thereafter, the acceleration having the acceleration value higher than the predetermined acceleration value occurs first in a state where the travel speed of the leisure vehicle is in the speed range higher than the predetermined upper limit speed value, and the portable device is configured to, upon receiving the confirmation signal, transition from the sleep mode to the active mode to transmit the response signal to the electronic key controller. The electronic key controller may be configured to output the control signal to cause the alarm to be raised, when the electronic key controller does not receive the response signal from the portable device in response to the confirmation signal within the predetermined time. With this configuration, the loss of the portable device, which would otherwise occur in a second acceleration state can be effectively avoided.

The above and further objects and features of the invention will more fully be apparent from the following detailed description with accompanying drawings.

DETAILED DESCRIPTION OF THE PREFERRED EMBODIMENTS

Hereinafter, an embodiment of an electronic key system for a leisure vehicle according to the present invention will be described with reference to the drawings. By way of example, an electronic key system for a motorcycle will be described.

Figure 1:
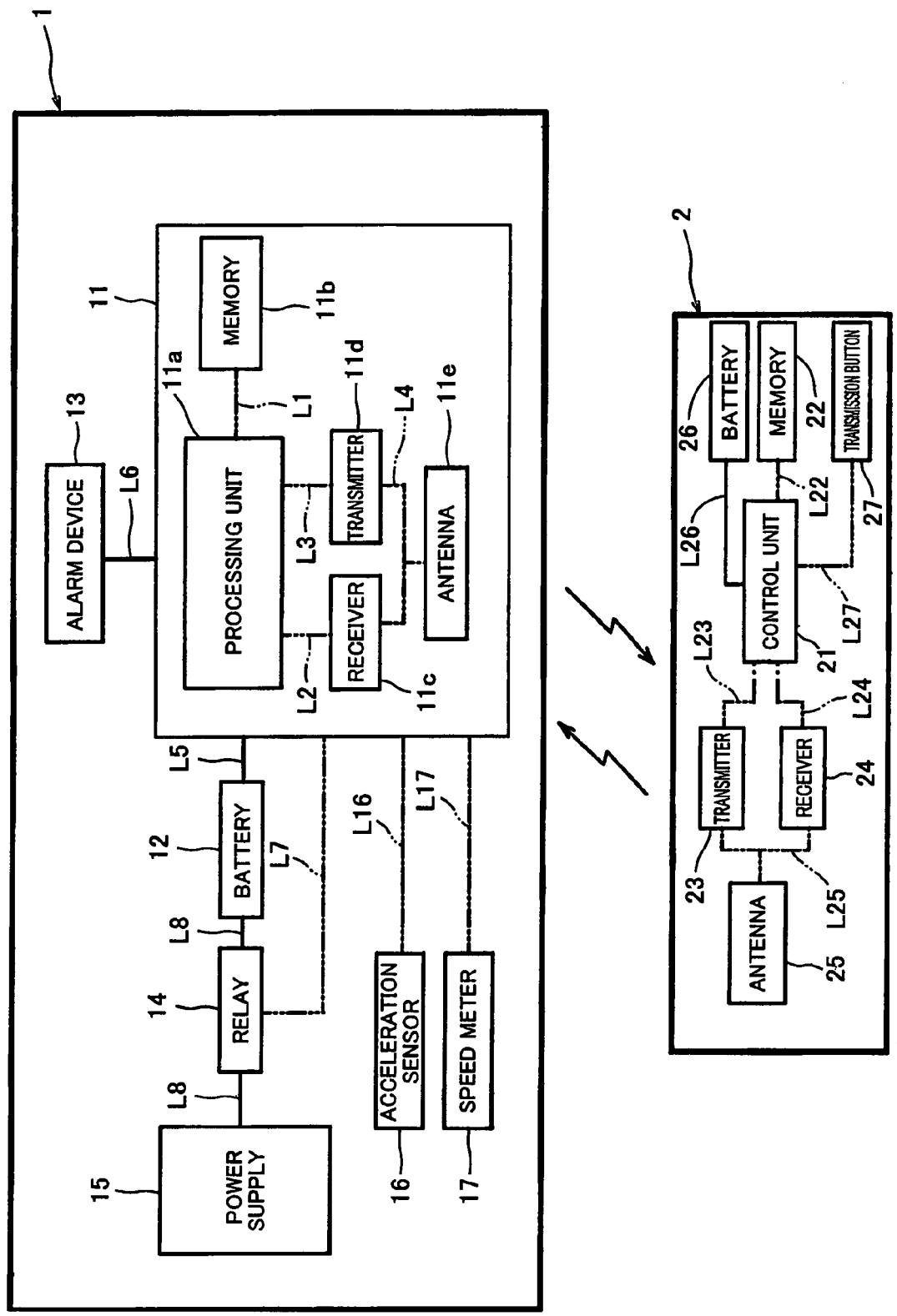
FIG. 1 is a block diagram showing a configuration of an electronic key system for a motorcycle according to an embodiment of the present invention.
Figure 2:
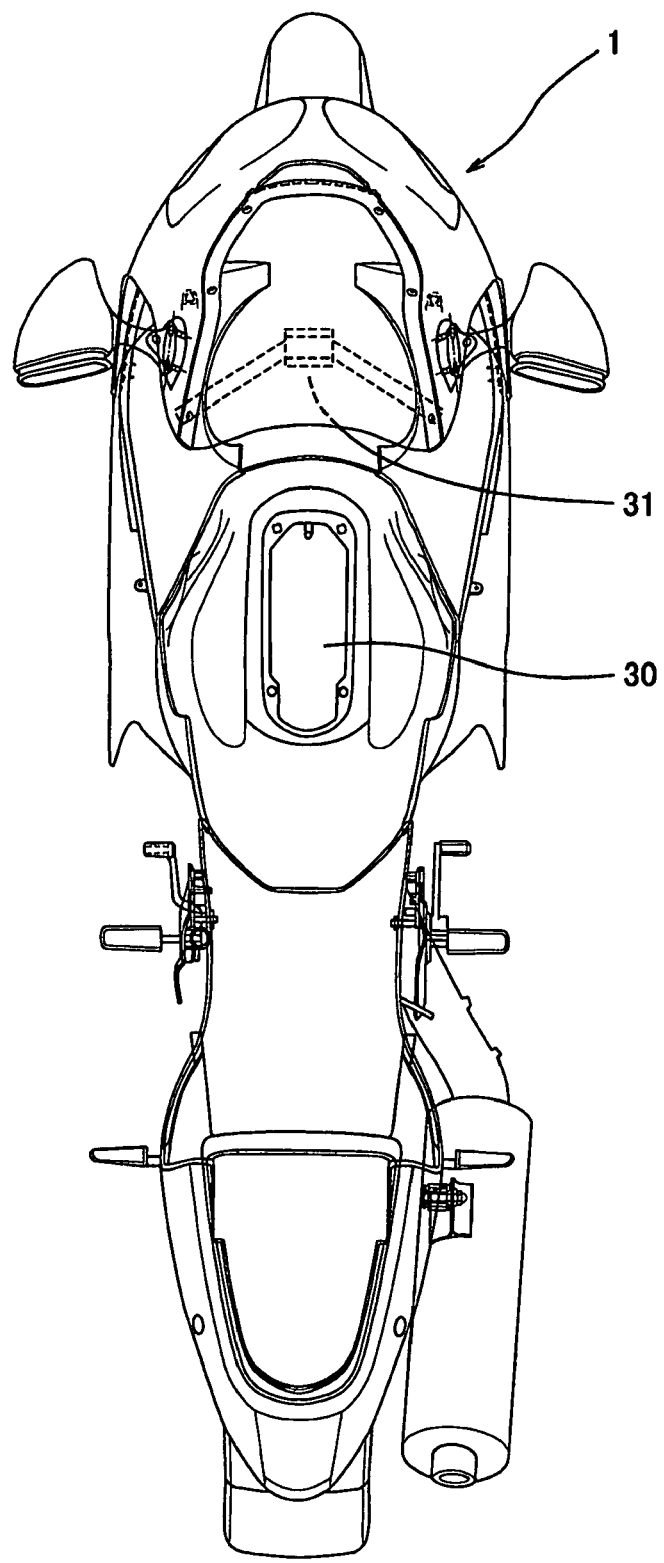
FIG. 2 is a plan view of an external appearance of the motorcycle equipped with the electronic key system of FIG. 1.
Figure 3:
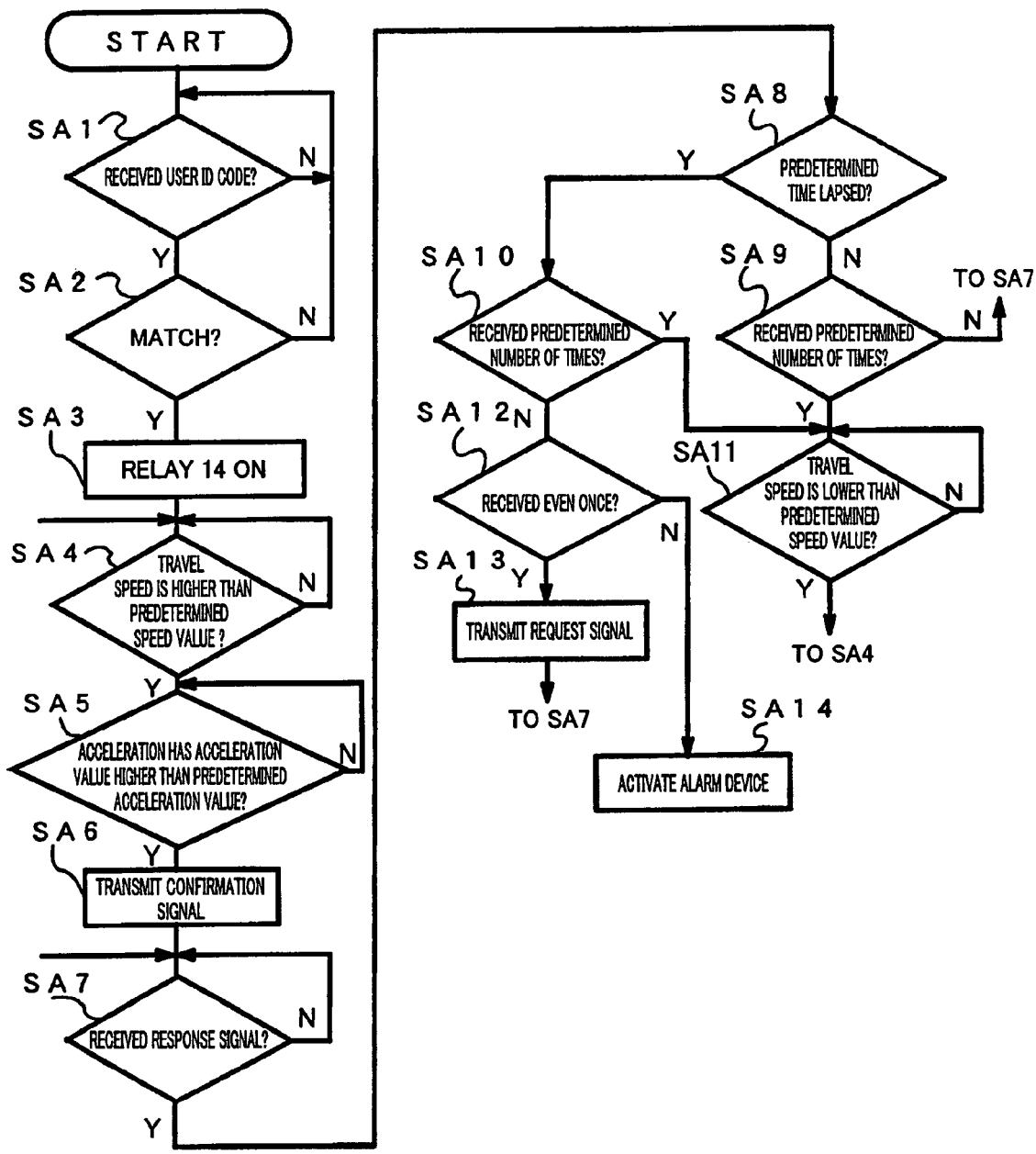
FIG. 3 is a flowchart showing a control program of an electronic key controller of the electronic key system of FIG. 1 which is mounted in a vehicle body of the motorcycle of FIG. 2.
Figure 4:
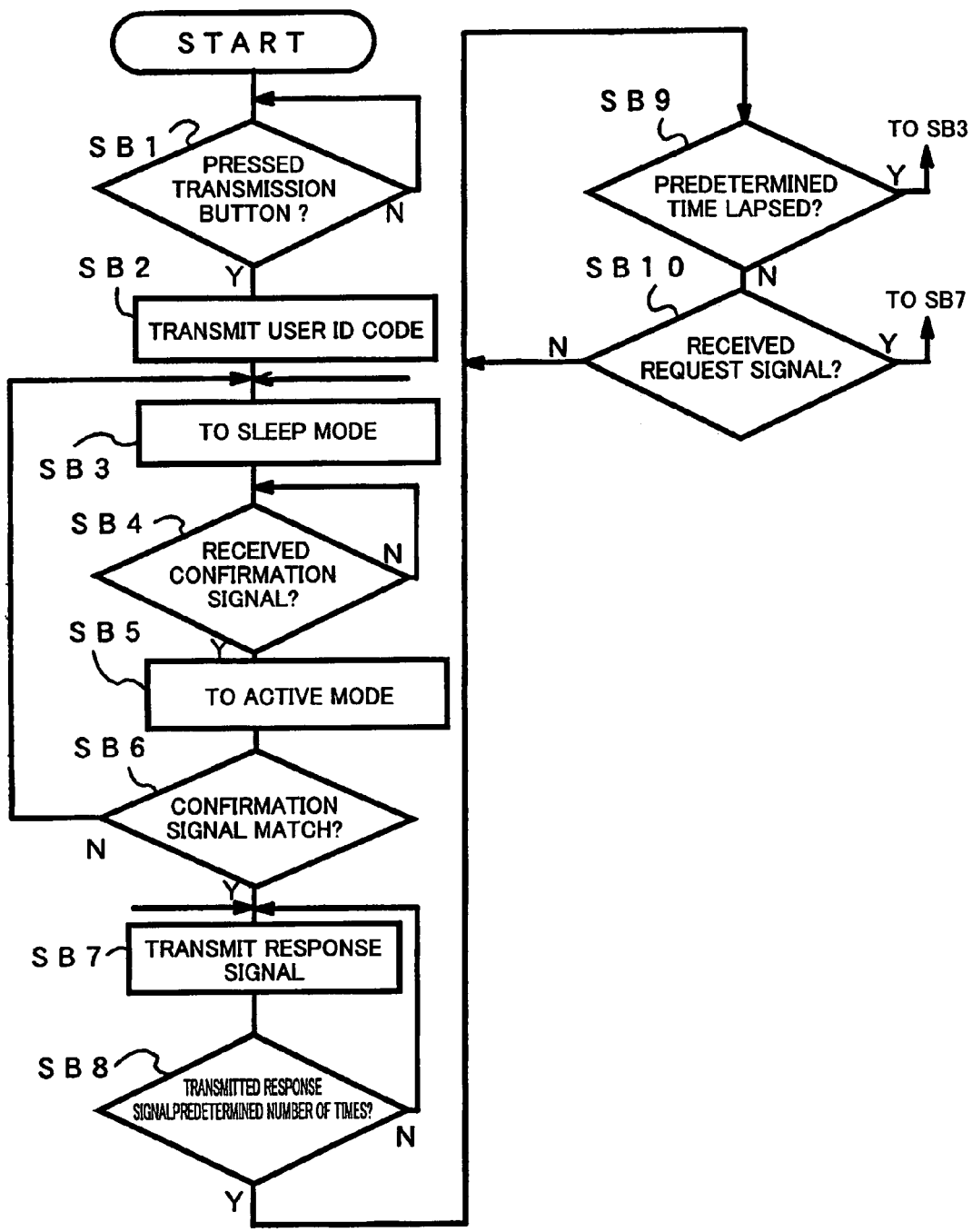
FIG. 4 is a flowchart showing a control program of a portable device in the electronic key system of FIG. 1 which is carried by a rider.

FIG. 1 is a block diagram showing a configuration of an electronic key system for a motorcycle according to an embodiment of the present invention. FIG. 2 is a plan view of an external appearance of the motorcycle equipped with the electronic key system of FIG. 1. FIG. 3 is a flowchart showing a control program of an electronic key controller of the electronic key system of FIG. 1 which is mounted in a vehicle body of the motorcycle of FIG. 2. FIG. 4 is a flowchart showing a control program of a portable device in the electronic key system of FIG. 1 which is carried by a rider.

Turning to FIG. 1, reference numeral 1 denotes a motorcycle (its external appearance is specifically shown in FIG. 2) equipped with the electronic key system of the present invention, and reference numeral 2 denotes a card-type portable device configured to transmit a user identification (ID) code by radio from a location a predetermined distance away from the motorcycle 1.

An electronic key controller 11, which is a part of the electronic key system of the present invention, is mounted in the motorcycle 1. The electronic key controller 11 includes a processing unit 11$b$ configured to check and authenticate a user ID code, a memory 11$a$ configured to store a correct user ID code, control programs described later, and so on, a receiver 11$c$ configured to receive the user ID code and a response signal which are transmitted from the portable device 2, a transmitter 11$d$ configured to transmit a confirmation signal to the portable device 2, and an antenna 11$e$ coupled to the receiver 11$c$ and to the transmitter 11$d$ via a communication line L4. The processing unit 11$a$ is coupled to the memory 11$b$ via a signal line L1 and to the receiver 11$c$ and to the transmitter 11$d$ via signals lines L2 and L3, respectively.

The electronic key controller 11 is coupled to a battery 12 of the motorcycle 1 via an electric wire L5 and is supplied with an electric power from the battery 12. The electronic key controller 11 is communicatively coupled to an alarm device 13 via an electric wire L6. The alarm device 13 may include a lamp or an alarm buzzer, or otherwise may include both of them.

The electronic key controller 11 is communicatively coupled to a relay 14 via a control line L7 to be able to control ON and OFF of the relay 14. The relay 14 is positioned in an intermediate point of an electric wire L8 coupling the battery 12 to an electric power supply circuit 15 of the motorcycle 1. When the relay 14 is turned on, the electric power is supplied from the battery 12 to the electric power supply circuit 15 which is a main switch of the motorcycle 1. When the electric power supply circuit 15 is turned on, the electric power is supplied to an ignition module, a fuel feed module, a starter module, etc of the motorcycle 1 so that an engine of the motorcycle 1 is started to enable the motorcycle 1 to travel.

The electronic key controller 11 is communicatively coupled to an acceleration sensor 16 of the motorcycle 1 via a signal line L16 and is configured to obtain data relating to a value of acceleration of the motorcycle 1 from the acceleration sensor 16.

The electronic key controller 11 is communicatively coupled to a speed meter 17 of the motorcycle 1 via a signal line L17 and is configured to obtain data relating to a travel speed of the motorcycle 1 from the speed meter 17.

One of the acceleration sensor 16 and the speed meter 17 may be provided and the other may be omitted. In that case, data obtained by one of the acceleration sensor 16 and the speed meter 17 may be differentiated or integrated to obtain data for the other. More specifically, data relating to the speed obtained in the speed meter 17 may be differentiated to obtain data relating to a value of acceleration, or data relating to acceleration of the accelerator sensor 16 may be integrated to obtain data relating to the travel speed.

An ECU (engine control unit) configured to control the engine of the motorcycle 1 and other components of the vehicle may serve as the processing unit 11$a$ and the memory 11$b$.

As shown in FIG. 1, the portable device 2 includes a control unit 21, a memory 22 configured to store a user ID code to be transmitted from the portable device 2 and a control program of the portable device 2 described later, a transmitter 23 configured to transmit the user ID code, a response signal, and other signals, a receiver 24 configured to receive the confirmation signal and other signals from the electronic key controller 11, an antenna 25 which is coupled to the transmitter 23 and to the receiver 24 via a communication line L4, a battery 26, which is for example, a button battery as an electric power supply of the portable device, and a transmission button 27 configured to be pressed by a rider to transmit the user ID code.

The control unit 21 is coupled to the battery 26 via an electric wire L26. The control unit 21 is further coupled to the memory 22 via a signal line L22, to the transmitter 23 via a communication line L23, and to the receiver 24 via a communication line L24. The antenna 25 is coupled to the transmitter 23 and to the receiver 24 via a communication line L25. The control unit 21 is coupled to the transmission button 27 via a signal line L27.

The program stored in the memory 11b of the electronic controller 11 and the program stored in the memory 22 of the portable device 2 are mutually run. When acceleration higher than a predetermined value occurs in the motorcycle 1, the electronic key controller 11 transmits the confirmation signal to the portable device 2. Receiving the confirmation signal, the portable device 2 transitions from a sleep mode to an active mode and transmits the response signal to the electronic key controller 11. When the rider carrying the portable device 2 in a pocket or the like comes closer than a predetermined distance away from the motorcycle 1 equipped with the electronic controller 11 and presses the transmission button 27, the portable device 2 transmits the user ID code to the electronic controller 11. Receiving the user ID code, the electronic controller 11 executes a check process for determining whether or not the transmitted user ID code matches the correct user ID stored in the memory 11b of the electronic controller 11, and authenticates the user ID code if it is determined that there is a match between them, thereby unlocking an electronic key for theft prevention. Thus, a theft prevention function is disabled.

Hereinafter, an operation of the electronic key system for the leisure vehicle configured as described above, and the programs stored in the memory 11b of the electronic controller 11 and the memory 22 of the portable device 22 will be described with reference to the flowchart shown in FIGS. 3, and 4. FIG. 3 shows a flowchart of the program of the electronic key controller 11 and FIG. 4 shows a flowchart of the program of the portable device 2. To distinguish the steps of the flowcharts between the electronic key controller 11 and the portable device 2, serial numbers A1, A2, A3, etc., are assigned to the flowchart of FIG. 3, and serial numbers B13, B2, and B3, etc., are assigned to the flowchart of FIG. 4.

To start the motorcycle 1 of FIG. 2, the rider comes closer than the predetermined distance away from the motorcycle 1 or is mounting the motorcycle 1, and presses the transmission button 27 of the portable device 2. The control unit 21 of the portable device 2 determines whether or not the rider has pressed the transmission button 27 in step B1 (SB1). If it is determined that the rider has pressed the transmission button 27 in step B1, the portable device 2 transitions from a sleep mode to an active mode. In the active mode, the control unit 21 of the portable device 2 reads out the user ID code stored in the memory 22 and transmits the user ID code via the transmitter 23, the antenna 25, and others in step B2 (SB2). After transmitting the user ID code, the control unit 21 causes the portable device 2 to transition to the sleep mode again in step B3 (SB3), thus saving electric power consumption.

The electronic key controller 11 mounted in the motorcycle 1 determines whether or not the user ID code has been received via the antenna 11e and the receiver 11c at suitable timings in step A1 (SA1). If it is determined that the user ID code has been received, the electronic key controller 11 transitions from the sleep mode to the active mode, and the processing unit 11a determines whether or not the received user ID code matches the correct user ID code stored in the memory 11b in step A2 (SA2). To be specific, the processing unit 11a reads out the correct user ID code from the memory 11b and determines whether or not this user ID code matches the received user ID code, and authenticates the received user ID code if there is a match between them.

If it is determined that there is a match between them in step A2, the processing unit 11a causes the relay 14 to be turned ON to unlock the motorcycle 1 in step A3 (SA3). Alternatively, the motorcycle 1 may be configured in such a manner that the user ID code is input from a user ID code input device equipped in the motorcycle 1 by the rider and the input user ID code is authenticated, if there is a match between the received user ID code and the correct user ID code, and there is a match between the input user ID code input by the rider and the correct user ID code, thereby unlocking the motorcycle 1. In that case, the theft prevention function of the electronic key system is further enhanced.

Upon the relay 14 being turned on, the electric power supply circuit 15 of the motorcycle 1 is turned on. Thereby, the ignition module, the fuel feed module, the starter circuit, etc are turned ON. Under this condition, the rider operates the starter button, to start the engine of the motorcycle 1, and operates an accelerator grip to propel the motorcycle 1.

When the rider starts traveling of the motorcycle 1, the electronic key controller 11 reads in data relating to the speed from the speed meter 17. The processing unit 11a of the electronic key controller 11 determines whether or not the travel speed becomes higher than a predetermined speed value (predetermined upper limit speed value), for example, 20 km/h in step SA4 (SA4).

If it is determined that the travel speed becomes higher than the predetermined upper limit speed value in step SA4, the electronic key controller 11 reads in data relating to an acceleration value from the acceleration sensor 16, and the processing unit 11a determines whether or not this acceleration value is higher than a predetermined acceleration value, which first occurs after the travel speed becomes higher than the predetermined speed value in step A5 (SA5).

If it is determined whether or not this acceleration value is higher than the predetermined value, which first occurs after the travel speed becomes higher than the predetermined value in step A5, the processing unit 11a of the electronic key controller 11 transmits the confirmation signal stored in the memory 11b via the transmitter 11d and the antenna 11e in step A6 (SA6).

The control unit 21 of the portable device 2 determines whether or not the confirmation signal has been received in step B4 (SB4). If it is determined that the confirmation signal has been received in step B4, the portable device 2 transitions from the sleep mode to the active mode in step B5 (SB5). Then, the control unit 21 of the portable device 2 determines whether or not the received confirmation signal matches the confirmation signal stored in the memory 22 in order to confirm that the received confirmation signal is the confirmation signal transmitted from the electronic key controller 11 associated with the portable device 2 in step B6 (SB6).

If it is determined that there is a match between them, and the confirmation signal has been authenticated in step B6, the control unit 21 of the portable device 2 transmits a response signal stored in the memory 22 via the transmitter 23 and the antenna 25 at predetermined time intervals and predetermined number of times, for example, 0.5 second intervals and 10 times in step B7 (SB7) and in step B8 (SB8). The time intervals and the number of times are not intended to be limited to these and other suitable interval lengths and number of times that the response signal is transmitted may be used.

The electronic key controller 11 determines whether or not a first response signal has been received within a predetermined time (e.g., 2 seconds) after transmitting the confirmation signal, and further determines whether or not the response signal transmitted from the portable device 2 has been received continuously for a predetermined number of times in steps A7 to step A9.

After the predetermined time has lapsed in a routine of step A7 to step A9, the electronic key controller 11 determines whether or not the response signal has been received continuously the predetermined number of times (10 times in this embodiment), in step A10 (SA10).

If it is determined that the response signal has been received continuously the predetermined number of times in step A10, or the response signal has been received continuously for the predetermined number of times in step S9, the electronic key controller 11 determines that the portable device 2 is not lost.

In step A11, the electronic key controller 11 determines whether or not the travel speed of the motorcycle 1 is lower than a predetermined speed value (predetermined lower limit speed value), for example, 10 km/h, based on the signal from the speed meter 17 (SA 11). Examples of situations in which the motorcycle 1 is traveling at a speed lower than the predetermined lower limit speed value include when the motorcycle is starting after being temporarily stopped in a tollbooth or rest area along a highway. At this time, the rider is more likely to lose the portable device 2.

If it is determined that the travel speed is lower than the predetermined lower limit speed value in step A11, the electronic key controller 11 returns the process to step A4, and executes the step A4 and the following steps to detect whether or not the portable device 2 has been lost. On the other hand, it is determined that the travel speed is higher than the predetermined lower speed value in step A11, the electronic key controller 11 continues detecting whether or not the travel speed is lower than the lower limit speed value.

In step A10, if it is determined that the response signal has not been received from the portable device 10 for a predetermined number of times, for example, 10 times in this embodiment, the electronic key controller 11 determines whether or not the response signal has been received once in step A12 (SA 12).

If it is determined that the response signal has been received even once in step A12, the electronic key controller 11 transmits a request signal to request the portable device 2 to further transmit the response signal predetermined number of times, for example, 10 times in this embodiment in step A13 (SA: 13). Then, the electronic key controller 11 returns the process to step A7 to determine whether or not the response signal has been received. The predetermined number of times in step A13 may be set depending on various desired conditions, and a different number instead of 10 times may be used.

If it is determined that the response signal has not been received even once in step A12, the electronic key controller 11 determines that the portable device 2 has been lost, and instructs the alarm device 13 to raise an alarm in step A14 (SA14) so that the rider can become aware of the loss of the portable device 2.

After transmitting the response signal predetermined number of times, for example, 10 times, the portable device 2 is in a wait state for a specified time, for example, 20 seconds in step B9 (SB9). The control unit 21 of the portable device 2 determines whether or not the request signal has been received from the electronic key controller 11 within the specified time in step B10 (SB 10).

If it is determined that the request signal has been received in step B10, the control unit 21 of the portable device 2 returns the process to step B7. On the other hand, if it is determined that the request signal has not been received in step B10, the control unit 21 of the portable device 2 returns the process to step B9.

If it is determined that a predetermined time has lapsed in step B9, the control unit 21 returns the process to step B3, and the portable device 2 enters sleep mode.

Even if the portable device is lost during acceleration of the motorcycle 1 when the portable device 2 is most likely to be lost, for example, in cases where the rider takes the portable device 2 along with the wallet out of the pocket in the tollbooth on a highway and puts it on a tank 30 (see FIG. 2) or a meter panel 31 (see FIG. 2) for a moment, or the portable device 2 falls off the pocket to the ground, the rider may start the motorcycle 1 without noticing that the portable device 2 has fallen off to the ground. In those cases, in the electronic key system equipped in the motorcycle 1 of the present invention, the alarm is raised to inform the rider that the portable device 2 has been lost. In this manner, the loss of the portable device 2 can be effectively prevented.

While in this embodiment, it is determined whether or not the portable device 2 has been lost in an acceleration state higher than the predetermined value which occurs first in a speed range in which the portable device 2 is most likely to fall off to the ground and be lost, it may alternatively be determined that the portable device 2 has been lost based on only whether the acceleration state is higher than the predetermined value. When it is determined whether or not the portable device 2 has been lost based on the acceleration state higher than the predetermined value which occurs first after the motorcycle 1 has started, the loss of the portable device 2 can be effectively inhibited, and wasteful consumption of the electric power of portable device 2 can be effectively inhibited.

The portable device 2, which is loaded with a battery with a small capacity, such as a so-called "button" battery, is in sleep mode except during a process for authenticating the confirmation signal from the electronic key controller 11 and the associated process for transmitting the response signal. This makes it possible to significantly reduce the electric power consumption in the battery as compared to the conventional portable device.

In this embodiment, when the travel speed of the motorcycle 1 is reduced to the predetermined lower limit speed value, the electronic key controller 11 moves the process to step A4 again to determine whether or not the portable device 2 has been lost so that the loss of the portable device 2 can be effectively inhibited during a re-acceleration state of the motorcycle 1. This may happen, when the portable device 2 is left on the meter panel 31 (see FIG. 2) for a moment, and does not fall off to the ground in the first acceleration state, but falls off to the ground in the second acceleration state.

Instead of the transmission button 27 attached to the portable device 2 in this embodiment, a transmission button may be attached to the motorcycle 1, and may be pressed to cause the electronic key controller 11 to transition from the sleep mode to the active mode. In the active mode, the processing unit 11a of the electronic key controller 1 transmits a user ID code request signal to the portable device 2, which transitions from the sleep mode to the active mode upon receiving the user ID code request signal. In that case, the advantages of the present invention can be achieved.

Various numeric values may be used as the numeric value of the acceleration in step A5. For example, to improve detecting precision of the electronic key system 1, numeric values near zero, for example, 0.1 to 0.3 km/sec$^2$ may be desirably used. For practical use, a numeric value that is several times as large as 0.1 to 0.3 km/sec$^2$ is desirable. The numeric value is suitably set depending on uses and development concepts of the associated vehicle.

Whereas the motorcycle has been illustrated as the leisure vehicle, the present invention may be applied to leisure vehicles such as all terrain vehicles, personal watercraft, snowmobiles, or utility vehicles including wheel loaders for civil engineering and construction, or farming. When the present invention is applied to the personal watercraft, the portable device may be attached to a wrist of a rider, and if the rider falls into the water, the alarm device raises the alarm and an engine is stopped. Thus, the electronic key system may be used as a tether switch.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. An electronic key system for a leisure vehicle, comprising:
    a portable device configured to transmit a user identification code by radio; and
    an electronic key controller that is equipped in a vehicle body of the leisure vehicle and is configured to receive the user identification code from the portable device and to cause an electric power supply of the leisure vehicle to be turned on upon receiving the user identification code;
    wherein the electric key controller is configured to transmit a confirmation signal to the portable device when acceleration of the leisure vehicle has an acceleration value higher than a predetermined acceleration value, and the portable device is configured to, upon receiving the confirmation signal, transition from a sleep mode to an active mode to transmit a response signal to the electronic key controller; and
    wherein the electronic key controller is configured to output a control signal to cause an alarm to be raised, when the electronic key controller does not receive the response signal from the portable device in response to the confirmation signal within a predetermined time.

2. The electronic key system according to claim 1, wherein the electronic key controller causes the alarm to be raised, when the electronic key controller does not receive the response signal continuously for a predetermined number of times from the portable device in response to the confirmation signal transmitted from the electronic key controller to the portable device.

3. The electronic key system according to claim 2, wherein the acceleration having the acceleration value higher than the predetermined acceleration value occurs first after the leisure vehicle has started travel.

4. The electronic key system according to claim 2, wherein the acceleration having the acceleration value higher than the predetermined acceleration value occurs first in a state where a travel speed of the leisure vehicle is in a speed range higher than a predetermined upper limit speed value.

5. The electronic key system according to claim 4, wherein the electronic key controller is configured to transmit the confirmation signal after the travel speed of the leisure vehicle becomes higher than the predetermined upper limit speed value, and to transmit a request signal to the portable device to request the portable device to further transmit the response signal when the electronic key controller does not receive the response signal continuously for the predetermined number of times.

6. The electronic key system according to claim 4, wherein the electronic key controller is configured to transmit the confirmation signal again, when the travel speed of the leisure vehicle becomes lower than a predetermined lower limit speed value, and thereafter the acceleration having the acceleration value higher than the predetermined acceleration value occurs first in a state where the travel speed of the leisure vehicle is in the speed range higher than the predetermined upper limit speed value, and the portable device is configured to, upon receiving the confirmation signal, transition from the sleep mode to the active mode to transmit the response signal to the electronic key controller; and
    wherein the electronic key controller is configured to output the control signal to cause the alarm to be raised, when the electronic key controller does not receive the response signal from the portable device in response to the confirmation signal within the predetermined time.

* * * * *